(12) United States Patent
Smith et al.

(10) Patent No.: US 11,008,107 B2
(45) Date of Patent: May 18, 2021

(54) THERMOPLASTIC COMPOSITE COMPONENTS FOR COMMERCIAL AIRCRAFT SEATS

(71) Applicant: Safran Seats USA LLC, Gainesville, TX (US)

(72) Inventors: Joshua T. Smith, Denton, TX (US); Donald M. Lasell, Denton, TX (US); Jean-marie Daout, Mukilteo, WA (US)

(73) Assignee: Safran Seats USA LLC, Gainesville, TX (US)

( * ) Notice: Subject to any disclaimer, the term of this patent is extended or adjusted under 35 U.S.C. 154(b) by 347 days.

(21) Appl. No.: 15/747,814

(22) PCT Filed: Feb. 12, 2016

(86) PCT No.: PCT/US2016/017737
§ 371 (c)(1),
(2) Date: Jan. 26, 2018

(87) PCT Pub. No.: WO2017/023363
PCT Pub. Date: Feb. 9, 2017

(65) Prior Publication Data
US 2018/0244392 A1    Aug. 30, 2018

Related U.S. Application Data

(60) Provisional application No. 62/201,858, filed on Aug. 6, 2015.

(51) Int. Cl.
*B32B 3/24* (2006.01)
*B64D 11/06* (2006.01)
(Continued)

(52) U.S. Cl.
CPC ........ *B64D 11/0648* (2014.12); *B29C 51/264* (2013.01); *B29C 70/46* (2013.01);
(Continued)

(58) Field of Classification Search
CPC ............... B29L 2031/771; B32B 3/266; Y10T 428/24314; Y10T 428/24273; B29C 70/545
See application file for complete search history.

(56) References Cited

U.S. PATENT DOCUMENTS

| 4,936,815 A | 6/1990 | Kirkland et al. |
| 2001/0024056 A1 | 9/2001 | Romca et al. |

(Continued)

FOREIGN PATENT DOCUMENTS

WO    2013021485    2/2013

OTHER PUBLICATIONS

International Patent Application No. PCT/US2016/017737, Invitation to Pay Additional Fees and, Where Applicable, Protest Fee and Partial Search Report, dated May 17, 2016.
(Continued)

*Primary Examiner* — William P Watkins, III
(74) *Attorney, Agent, or Firm* — Kilpatrick Townsend & Stockton LLP (57) ABSTRACT

Described are thermoplastic composite parts (30, 110) made up of resin-based fiber composites for use in aircraft furnishings. The thermoplastic composite parts (30, 110) can be formed into various shapes including bends so as to be suitable for replacing heavier sheet-metal components (100), particularly in aircraft furnishings.

25 Claims, 9 Drawing Sheets

(51) Int. Cl.
*B29C 70/46* (2006.01)
*B29C 70/54* (2006.01)
*B29C 51/26* (2006.01)
*B32B 3/26* (2006.01)
*B29K 81/00* (2006.01)
*B29K 105/08* (2006.01)
*B29K 307/04* (2006.01)
*B29L 31/34* (2006.01)
*B29L 31/00* (2006.01)

(52) U.S. Cl.
CPC ...... *B29C 70/545* (2013.01); *B29C 2791/002* (2013.01); *B29C 2793/0018* (2013.01); *B29C 2793/0027* (2013.01); *B29C 2793/0081* (2013.01); *B29K 2081/04* (2013.01); *B29K 2105/0845* (2013.01); *B29K 2307/04* (2013.01); *B29L 2031/3481* (2013.01); *B29L 2031/771* (2013.01); *B32B 3/266* (2013.01); *Y10T 428/24273* (2015.01); *Y10T 428/24314* (2015.01)

(56) References Cited

U.S. PATENT DOCUMENTS

2005/0284116 A1* 12/2005 Duffy ................... B01D 46/521
                                                    55/497
2013/0119191 A1  5/2013  Wolfe et al.
2015/0202999 A1  7/2015  Jafri et al.

OTHER PUBLICATIONS

International Patent Application No. PCT/US2016/017737, International Search Report and Written Opinion, dated Aug. 29, 2016.
International Patent Application No. PCT/US2016/017737, International Preliminary Report on Patentability, dated Nov. 14, 2017.

* cited by examiner

THERMOPLASTIC COMPOSITE COMPONENTS FOR COMMERCIAL AIRCRAFT SEATS

CROSS REFERENCE TO RELATED APPLICATIONS

This application is related to and claims priority benefits from U.S. Provisional Application Ser. No. 62/201,858 ("the '858 application"), filed on Aug. 6, 2015, entitled DESIGN OF HIGHLY PRODUCIBLE STRUCTURAL THERMOPLASTIC COMPOSITE COMPONENTS FOR COMMERCIAL AIRCRAFT SEATS. The '858 application is hereby incorporated in its entirety by this reference.

FIELD OF THE DISCLOSURE

The field of the disclosure relates to structural components of furnishings for passenger vehicles such as aircraft.

BACKGROUND

The cabin of a typical passenger aircraft is dominated by rows of seats for seating passengers. These seats are typically formed of a metal structure having attachment points for aluminum sheet metal components which are fastened to the structure of the seat assembly. The sheet metal components can be used for a variety of applications, including containers for electronic devices such as an in-flight electronics module (IFE), seat pans, seat backs, and other structural and load-bearing parts. In addition, some or all of the above sheet metal parts may be covered by thermoplastic molded parts, which can include formed surfaces for seat pans and seat backs, seatback shrouds, covering layers to conceal connectors and to conceal electronic devices within the seat assembly, and other suitable molded plastic covers. Typically, the combination of sheet metal and plastic covers is heavy and expensive. However, the expense and weight of utilizing sheet metal components has been justified by the performance criteria and high safety tolerances demanded of aircraft seat assemblies.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a thermoplastic composite structural component can be used for replacing sheet metal structural parts in a passenger furnishing such as an aircraft seat assembly. Various thermoplastic composite structural components are within the scope of the disclosure. For example, embodiments of a thermoplastic composite component can include a bent thermoplastic composite component for replacing sheet metal structural parts in a passenger furnishing. The bent composite structural component can be formed of a thermoplastic composite sheet comprising a resin and reinforcing fibers. The sheet can have one or more attachment features integrally formed therein, and can have one or more bends in the thermoplastic composite sheet defining a three-dimensional structure.

In certain embodiments, a bent composite structural component can also include one or more voids. The voids can be integrally formed therein, and can be configured to reduce the weight of the part, to facilitate airflow through the part, and or to increase a flexibility of the part. A bent composite structural component can also include one or more cuts in one or more sides of the part. In some cases, the cuts can facilitate a bidirectional bend in the part. In some specific cases, the cuts can define a substantially triangular cutout configured to form a corner joint in a three-dimensional part. In some cases, the bent composite structural component can include one or more bends integrally formed therein where the bends do not form a discontinuity or break in the reinforcing fibers of the composite structural component.

According to certain embodiments, a thermoplastic composite structural component can be formed of various resin materials and/or various reinforcing fibers. In some cases, a composite structural component can include carbon fiber reinforcement, which can include monodirectional, bidirectional, or various forms and configurations of multidirectional carbon fiber sheets. In some cases, the matrix material can comprise a polyphenylene sulfide (PPS) resin. In some other cases, the matrix material can comprise one or more of polyphenylene sulfide (PPS), polyetheretherketone resin (PEEK), polyetherimide resin (PEI), polycarbonate resin (PC), or combinations thereof.

According to certain embodiments, a thermoplastic composite structural component can comprise a structural part of an aircraft seat. In some specific embodiments, a thermoplastic composite structural component can include one of: an in-flight electronics (IFE) box, a seat pan, a seat back, a seatback shroud, or similar structural part.

According to certain embodiments, thermoplastic composite structural components, such as those described above, can be formed by modifying a thermoplastic composite blank. In various embodiments, the blank can be modified by performing a reductive manufacturing step to remove material, e.g. to create attachment points in the blank. The blank can be heated to a transition temperature and pressed in a pressure form to bend the blank along predetermined bend lines configured to form the blank into the structural part. The blank can be cooled to below its transition temperature, at which point the bends are permanent.

In some embodiments, a method of forming a thermoplastic composite structural component can include removing material from a perimeter of the part, so as to form notches and/or gaps for facilitating bidirectional bends for corner joints. In some cases, material can be removed using water jet cutting and/or milling.

A method of forming a thermoplastic composite structural component can also include pressing a blank to form one or more bidirectional bends defining corner joints. In some specific cases, a heating step for heating the blank to a transition temperature can take 60 seconds or less. In some specific cases, a pressing step for pressing a heated blank into a three-dimensional shape can also take 60 seconds or less.

According to certain embodiments, thermoplastic composite structural components can be used to retrofit existing passenger furnishings. In various embodiments, a conventional structural part, e.g. a plastic-covered aluminum sheet metal part, can be removed from a passenger furnishing. A suitable thermoplastic composite structural component can be inserted into a structure of the passenger furnishing to replace the removed part, and can be connected with the passenger furnishing. In some cases, the thermoplastic composite structural part can be connected with the structure of the passenger furnishing via one or more locking tie straps. In some cases, the thermoplastic composite structural part can include: a seat back, a seat pan, a seatback shroud, an IFE box, or a comparable structural part.

BRIEF DESCRIPTION OF THE DRAWINGS

FIGS. 3-5 illustrate exemplary forming process stages of a forming process for generating a thermoplastic composite part like the part of FIGS. 1 and 2, in accordance with embodiments;

FIGS. 11-13 illustrate exemplary stages of a forming process for generating a thermoplastic composite seat back, in accordance with embodiments;

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide lightweight thermoplastic composite components for passenger seats. While the thermoplastic composite components are discussed for use with aircraft seats, they are by no means so limited. Rather, embodiments of the thermoplastic composite components may be used in passenger seats or other seats of any type or otherwise as desired. Furthermore, various embodiments of thermoplastic composite components may be produced according to the methods herein disclosed, which may be suitable for multiple applications in aircraft seat assemblies, other types of seat assemblies, or otherwise as desired. Portions of the following description relate to in-flight electronics or entertainment unit (IFE) boxes made of thermoplastic composite components, but it should be understood that the methods and materials of this disclosure may be used in connection with other types of components.

Figure 1:
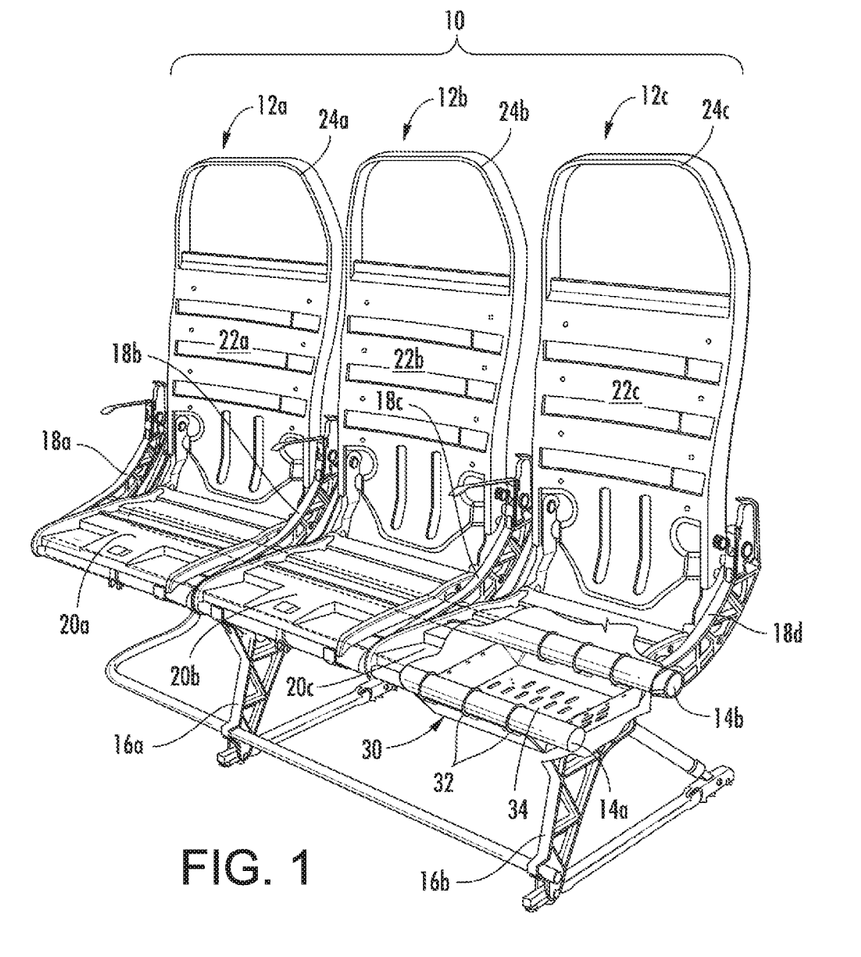
FIG. 1 is a perspective view of a naked seat assembly including a thermoplastic composite part for holding an IFE box, according to certain embodiments.

According to certain embodiments of the present disclosure, as shown in FIG. 1, a seat assembly 10 comprises a grouping of connected seats 12a-12c (cumulatively 12). In various embodiments, a seat assembly may include more or fewer seats without departing from the spirit of the present disclosure. The seats 12 can be supported along rails 14a, 14b which may be supported via structural posts 16a, 16b, and which may subsequently provide support to various other components of the seat assembly 10 via support arms 18a-18d. Some components supported in this way can include seat pans 20a-20c, seat backs 22a-22c, seat frames 24a-24c, and various other structural components.

By way of example, an IFE box 30 may be connected with the seat assembly 10. A typical IFE box is a container configured to support an electronics enclosure 34 which may weigh several pounds. IFE boxes are often stored underneath a passenger seat such that the IFE box does not impinge on passenger space but is securely restrained from movement. An IFE box may need to have relatively high strength, as IFE components can be dense and prone to causing injury if they were to detach in a crash event or other similar high-acceleration event. For the aforementioned reasons, typical IFE boxes are constructed from high-strength aluminum sheet metal parts, which are covered in a plastic covering part to hide the sheet metal and obscure the connectors between the sheet metal and the seat assembly.

In accordance with embodiments, the IFE box 30 may be constructed from a thermoplastic composite material and may be securely fastened to the underside of the seat assembly 10 via one or more connectors 32. The IFE box 30 can be attached to the rails 14a, 14b via any suitable connecter. Connectors may include heavy-duty tie, or may include any other suitable tie strap material, such as blends of nylon cording, metal brackets, or other conventional fasteners such as bolts, screws, adhesives, plastic welds, or other comparable fasteners. In some cases, the IFE box 30 may be connected to the seat assembly 10 absent any additional plastic coverings.

Figure 2:
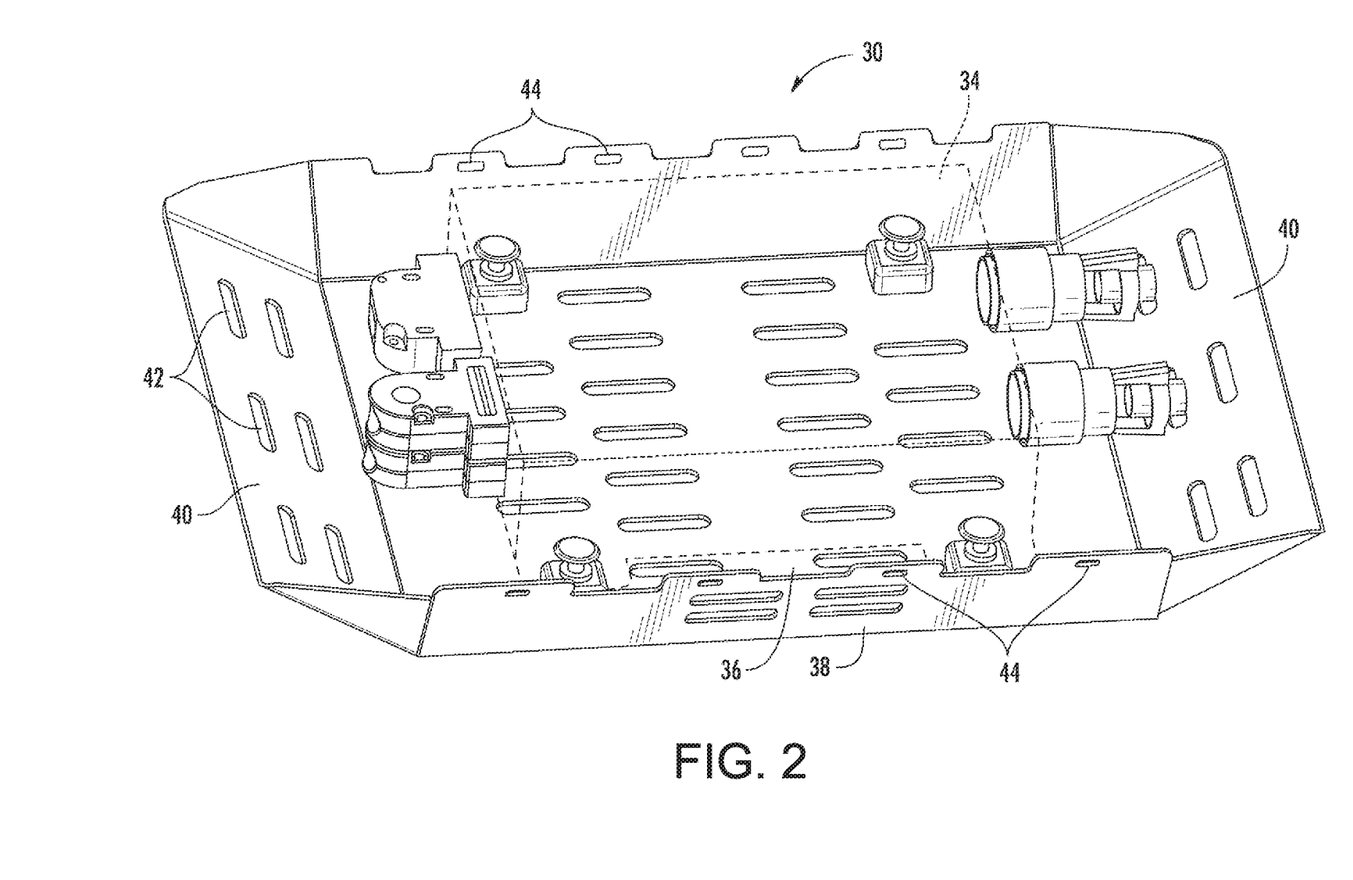
FIG. 2 is a perspective view of the thermoplastic composite part of FIG. 1 showing greater detail.

FIG. 2 illustrates the thermoplastic composite IFE box 30 of FIG. 1 in greater detail. The IFE box 30 can be formed of a thermoplastic composite sheet defining a bottom 36, and a three-dimensional structure including two long sides 38 and two short sides 40 which form an open ended supportive box. The IFE box 30 is sized and configured to support an IFE module 34. The IFE box 30 can include a plurality of through-holes 42 which may serve dual purposes of reducing the weight of the IFE box 30 and/or allowing the passage of air into and out of the IFE box, so as to permit better venting of hot air from the electronics in the IFE module 34. A plurality of connecting features 44 can also be included directly in the walls 38 of the IFE box 30. The connecting features may be configured to enable the attachment of the IFE box with a seat assembly such as the seat assembly 10 of FIG. 1.

In various embodiments, the thermoplastic composite material forming components such as the IFE box 30 may include any suitable composite formed of a thermoplastic resin with fiber reinforcement. In specific embodiments, the thermoplastic composite material may be a carbon fiber composite formed with a Polyphenylene Sulfide (PPS) resin. In various embodiments, the fiber reinforcement may instead by a fiberglass composite, a high strength polymer/polymer fiber composite, combinations thereof, or other suitable composite. In various alternative embodiments, the resin may be any suitable thermoplastic resin, such as, but not limited to: polyetheretherketone resin (PEEK), Polyetherimide resin (PEI), or polycarbonate resin (PC), or combinations thereof. The thermoplastic composite material may be formed of various layering regimes of the fiber, such as quasi-isotropic arrangements, anisotropic arrangements, or arrangements having added fibers in a primary and/or secondary direction for accommodating high expected directional loading. In some embodiments, a quasi-isotropic configuration may include two, three, four, or more layers oriented at regular or at irregular rotational intervals. Woven or interlaced configurations may also be suitable. For example, woven or interlaced configurations may include multiple layers of woven fiber mats at the same or at different rotational orientations. In some cases, resin may make up approximately 38% of the composite part by weight. In some cases, resin contents may be between 33% and 45% of the composite part by weight. However, various other ranges may be suitable depending on the specific composite materials selected.

Figure 3:
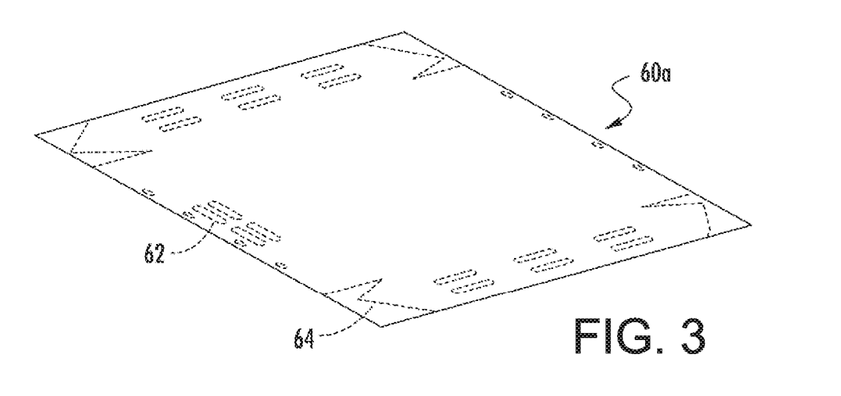
FIG. 3 is a perspective view of a thermoplastic composite blank.
Figure 4:
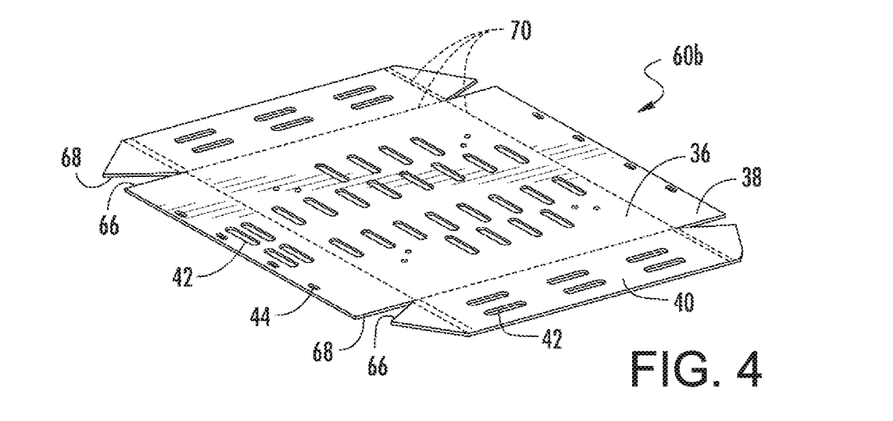
FIG. 4 is a perspective view of the a partially formed thermoplastic composite part after material has been removed from the blank of FIG. 3.
Figure 5:
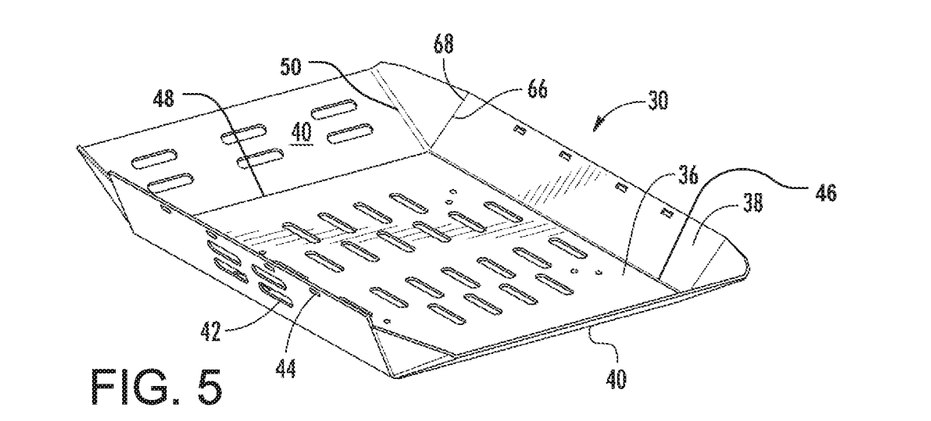
FIG. 5 is a perspective view of the thermoplastic composite part of FIGS. 1-4, showing greater detail.

FIGS. 3-5 illustrate exemplary forming process stages of a forming process for generating a thermoplastic composite part as illustrated by FIGS. 1 and 2, in accordance with embodiments. A first stage of a forming process for a thermoplastic composite part generally comprises forming a thermoplastic composite blank, such as the blank 60a shown in FIG. 3.

FIG. 3 is a perspective view of a thermoplastic composite blank 60a configured to be formed into a molded thermoplastic composite part such as the part 30 shown in FIGS. 1-2. Although the blank 60a is shown with the exemplary part 30 in mind, various aspects of the forming process are applicable to many embodiments of thermoplastic composite parts. The blank 60a can be formed by any suitable thermoplastic composite forming process. For example, the blank 60a may be formed by hand layup, by resin transfer molding which may include vacuum-assisted resin transfer molding, by pultrusion, by continuous laminating, or other suitable methods for forming resin-based fiber composites. The blank 60a can be formed with any suitable number of fiber layers and in any suitable number of fiber layer orientations or configurations, as described above. In one example, the blank 60a may be a substantially flat part, which may be simple to manufacture and transport for additional modification. Locations of future voids 62 and cuts 64 are shown for reference.

FIG. 4 is a perspective view of a partially formed thermoplastic composite part 60b after material has been removed from the blank 60a of FIG. 3. Reference lines 70 are shown denoting future positions of folds in the partially formed part 60b. The partially formed part 60b is configured to be bent into a structural shape. The partially formed part 60b can include a bottom 36, a first parallel set of sides 38, and a second parallel set of sides 40 that are substantially parallel to the first pair of sides. The partially formed part 60b includes features for facilitating bending of the part into a final shape. For example, material has been removed from the blank 60a (FIG. 3) to produce interior corners 66 and interior edges 68 which are configured to meet when the partially formed part 60b is ultimately bent into a final shape. Voids 42 have also been removed from the blank 60a, as well as smaller voids comprising attachment points 44.

FIG. 5 is a perspective view of the thermoplastic composite part 30 of FIGS. 1-2, showing greater detail and in-line with the blank 60a and partially formed part 60b of FIGS. 3-4. The partially formed part 60b (FIG. 4) has been bent along the reference lines 70 to form bends 46, 48, and 50, which raise the first and second sets of sides 38, 40 to angle the sides with respect to the bottom 36 of the part 30 to form the three-dimensional thermoplastic composite part 30. Interior corners 66 and interior edges 68 can meet with or without being physically joined. The bends 46, 48, 50 may be formed at a variety of bend radii, and the bends are generally structurally sound without additional reinforcement. In some embodiments, the bends are formed with a bend radius approximately equal to or greater than the thickness of the thermoplastic composite part (a 1 T radius). Larger bend radii are readily possible, up to and including parts formed with predominantly curved sidewalls. Details of the molding process for forming the final shape are described in greater detail below.

Figure 6:
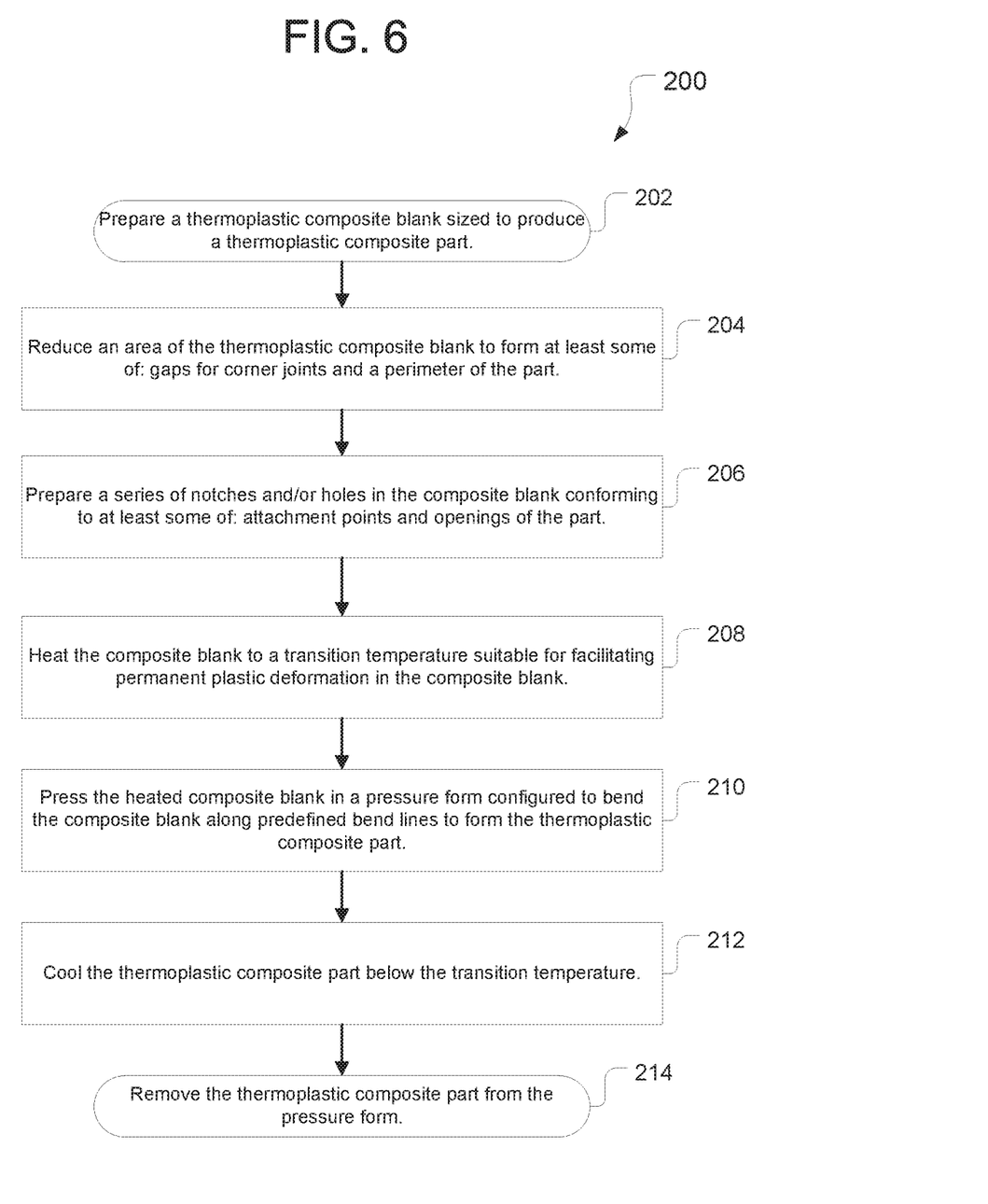
FIG. 6 is a process flow diagram illustrating an example of a manufacturing process for forming a thermoplastic composite part such as the thermoplastic composite part of FIGS. 1-5.

FIG. 6 is a process flow diagram 600 illustrating an example of a manufacturing process for forming a thermoplastic composite part, such as the part 30 described above with reference to FIG. 105, or other bent thermoplastic composite parts, in accordance with embodiments. First, a thermoplastic composite blank can be prepared which is sized appropriately to produce a thermoplastic composite part (act 202). Next, material is removed from the blank via any suitable subtractive manufacturing step to form gaps for accommodating corner joints and for defining a final perimeter of the part (act 204). In some cases, material may be removed by water jet cutting. In other cases, suitable subtractive manufacturing steps may also include mechanical cutting, milling, drilling, stamping, punching, or any suitable, comparable manufacturing step. Material may also be removed to form a series of voids, such as notches, holes, and attachment points in the blank via any of the above-described manufacturing steps (act 206). The thermoplastic composite blank may then be heated to a transition temperature, wherein the transition temperature is any suitable temperature range for facilitating permanent plastic deformation of the composite blank (act 208). The specific transition temperature may vary depending on the specific resin material being used in the part. Generally, the temperature will include a range of temperatures in which the resin material becomes pliable, but without inducing separation of the resin material from the fiber reinforcement. In some cases, the heating operation to raise the temperature into a suitable transition temperature range can be effective in approximately 60 seconds.

The effective transition temperature and/or temperature range of a composite part can be highly dependent on the specific thermoplastic resin being utilized. In some cases, the transition temperature is the melt temperature or softening temperature, normally expressed as a range of heat where the resin softens. By way of example, some Polycarbonate (PC) resins have a transition temperature or softening point of approximately 146 degrees C. Some Polyetherimide (PEI) resins have a transition point of approximately 210 degrees C.; some Polyphenylenesufide (PPS) resins have a transition point of approximately 293 C; and some Polyetheretherimide (PEEK) resins have a transition point of approximately 343 degrees C.

Next, the heated thermoplastic composite blank can be pressed in a pressure form or a pressure mold configured with the final shape of the thermoplastic composite part, so as to bend the blank into the final shape along predetermined bend locations (act 210). The bending operation will typically not form discontinuities or breaks in the reinforcing fibers. In some cases, the blank may be heated prior to being placed in the pressure form or pressure mold, but in other cases, the pressure form may include heating elements configured to raise the temperature the blank within the form. In some cases, the thermoplastic composite part may be secured in a correct forming orientation via one or more voids in the blank being aligned with surface features within the form. In some cases, the bending operation can form a structurally sound part by exerting pressure on the part for approximately 60 seconds. The bent thermoplastic composite part, now in its final shape, can then be cooled to below its transition temperature. At this point, the part will retain its final shape without additional support (act 212). The thermoplastic composite part in its final shape may then be ejected from the pressure form (act 214). In some cases, the cooling may take place within the form, but in other cases, the part may be ejected from the form and then allowed to cool.

Figure 7:
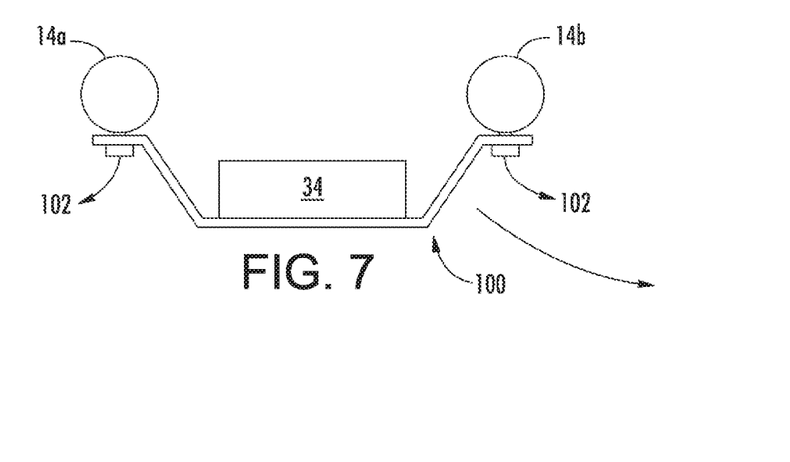
FIGS. 7-9 illustrate exemplary retrofitting process stages of a retrofitting process for replacing a sheet metal structural part with a thermoplastic composite part.
Figure 8:
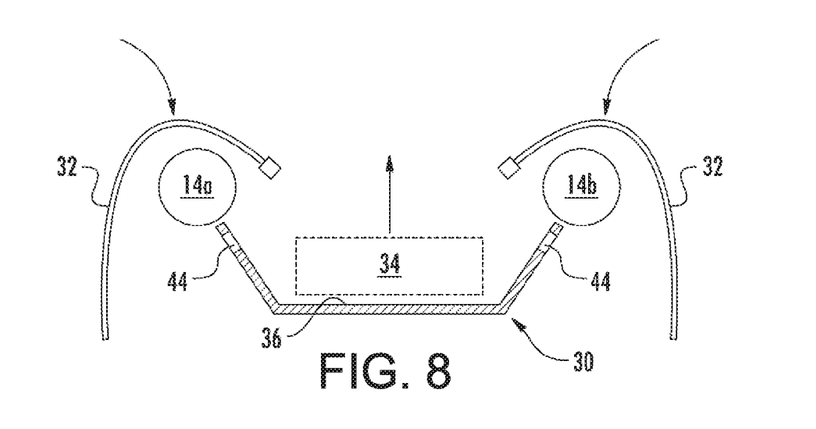
Figure 9:
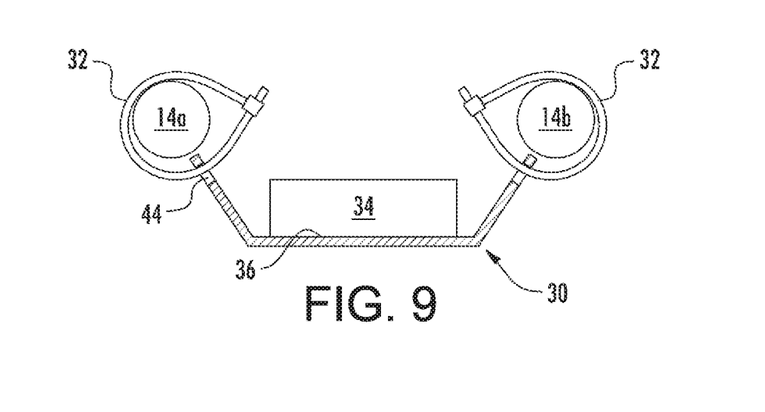

FIGS. 7-9 illustrate exemplary retrofitting process stages for replacing a sheet metal structural part with a thermoplastic composite part, in side section views, in accordance with embodiments. For example, FIG. 7 illustrates the supports 14*a*, 14*b* shown in FIG. 1 with a conventional (i.e., sheet metal) part 100 connected with the supports via connectors 102. An IFE module 34 is shown being supported by the conventional part 100. In accordance with embodiments, the connectors 102 can be removed and the conventional part 100 can be uninstalled. FIG. 8 illustrates the thermoplastic composite part 30 being inserted in place of the conventional part underneath the supports 14*a*, 14*b*, such that the bottom 36 of the part supports the IFE module 34. The thermoplastic composite part 30 can be connected with the supports via any suitable attachment means as described above. For example, the thermoplastic composite part 30 can be connected via plastic locking straps 32, which can be wrapped entirely around the supports 14*a*, 14*b*, or may alternatively be connected with attachment features of the supports (not shown). FIG. 9 illustrates the thermoplastic composite part 30 secured to the supports 14*a*, 14*b* by the plastic locking straps 32. The plastic locking straps 32 are wound around the supports 14*a*, 14*b* and pass through attachment features 44 of the thermoplastic composite part 30.

Figure 10:
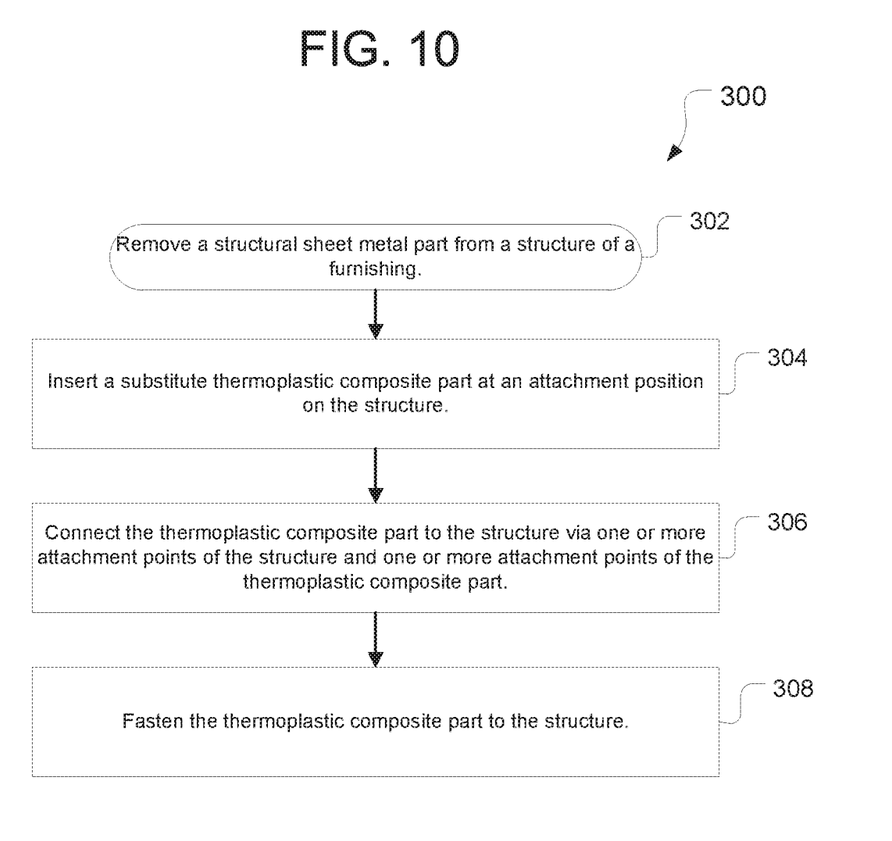
FIG. 10 is a process flow diagram illustrating an example of a retrofitting process for replacing a sheet metal structural part with a thermoplastic composite part.

FIG. 10 is a process flow diagram illustrating an example of a retrofitting process 300 for replacing a sheet metal structural part with a thermoplastic composite part. In a first step, a structural sheet metal component can be removed from a structure of a furnishing (act 302). In some cases, removing the structural sheet metal component may also include removing a plastic covering of the component. Next, a substitute part comprising a bent thermoplastic composite part can be inserted in an attachment position of the structure (act 304). The thermoplastic composite part can be connected with the structure at one or more attachment points of the structure and one or more attachment points of the thermoplastic structural part (306). In some cases, connecting the thermoplastic composite part and the stricter can be achieved by wrapping one or more locking plastic tie straps or comparable fasteners to a portion of the structure (e.g. a support structure) and connecting the fastener to an attachment point that is integrally formed in the thermoplastic composite part (act 308). In many cases, the thermoplastic composite part may not require additional plastic covering, in contrast to the replaced sheet metal part, therefore an optional step of reattaching a plastic covering can be omitted.

Many variations of thermoplastic composite parts may be used to replace conventional sheet-metal structural components. A non-limiting list of components which may be replaced in this manner can include: seat pans, seat backs, seatback shrouds, and other covering layers that may be configured to conceal and/or support electronics or other equipment. For example, FIGS. 11-13 illustrate stages of a forming process for generating a thermoplastic composite seat back, in accordance with embodiments.

Figure 11:
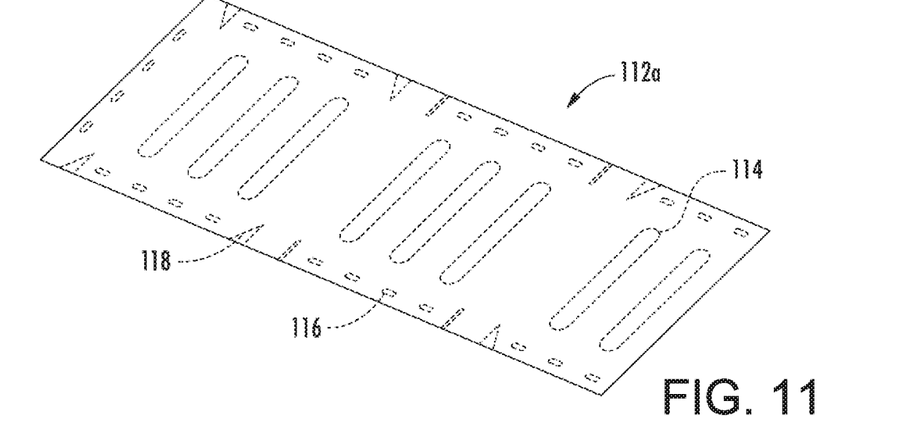
FIG. 11 is a perspective view of a thermoplastic composite blank for forming a seat back.
Figure 13:
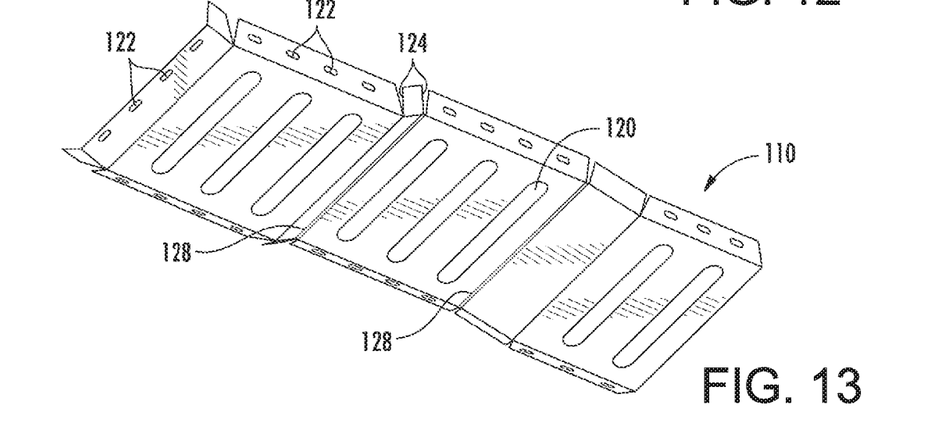
FIG. 13 is a perspective view of a thermoplastic composite seat back formed from the blank of FIGS. 11-12.

FIG. 11 is a perspective view of a thermoplastic composite blank 112*a* for forming a thermoplastic composite seat back 110 (FIG. 13). The blank 112*a* of FIG. 11 is similar in form to the blank 60*a* of FIG. 3. The blank 112*a* may likewise be formed of any suitable thermoplastic composite forming process as described above with reference to FIG. 3. The blank 112*a* is preferably sized based on a surface area of a final shape of the composite seat back 110. Locations of future voids 114, attachment features 116, and cuts 118 for forming bends in the blank are shown for reference.

Figure 12:
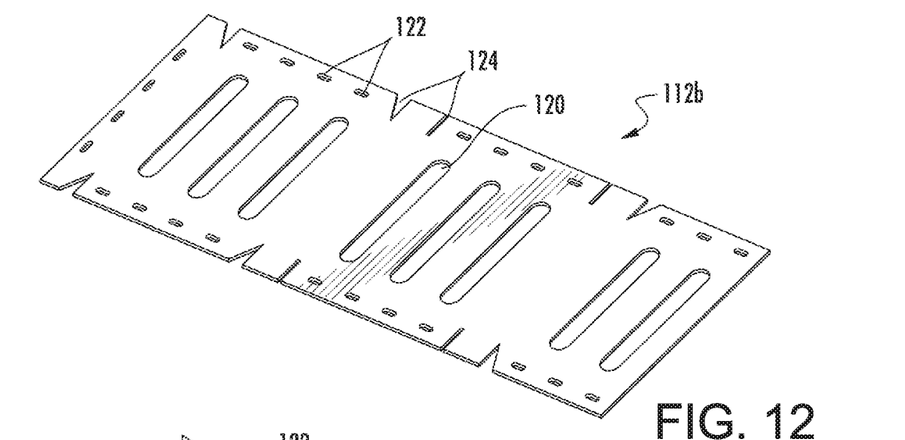
FIG. 12 is a perspective view of a partially formed thermoplastic composite seat back after material has been removed from the blank of FIG. 11.

FIG. 12 is a perspective view of a partially formed thermoplastic composite seat back 112*b* after material has been removed from the blank 112*a* of FIG. 11. Various attachment features 116 comprising small voids in the material have been removed from the blank around a perimeter of the partially formed seat back 112*b* so as to facilitate various attachment configurations. Voids 120 have also been formed in the blank 112*a*, which may reduce weight and provide for air transfer across the seat back 110. Material has also been removed to form a series of gaps and grooves 124 which are configured to enable bi-directional bending of the part into a final shape.

FIG. 13 is a perspective view of a thermoplastic composite seat back 110 formed from the blank of FIGS. 11-12, in accordance with embodiments. The seat back 110 can include a plurality of integrally formed attachment points 122 arranged around a perimeter of the seat back for facilitating attachment to a structure of a seat. The seat back 110 may also include a plurality of voids 120 integrally formed in the material of the seat back. The seat back has been bent into a three-dimensional shape along bidirectional bends 128 facilitated by the series of gaps and grooves 124. Process steps for forming the thermoplastic composite seat back 110 may be the same or similar to the process steps illustrated in FIG. 6.

Figure 14:
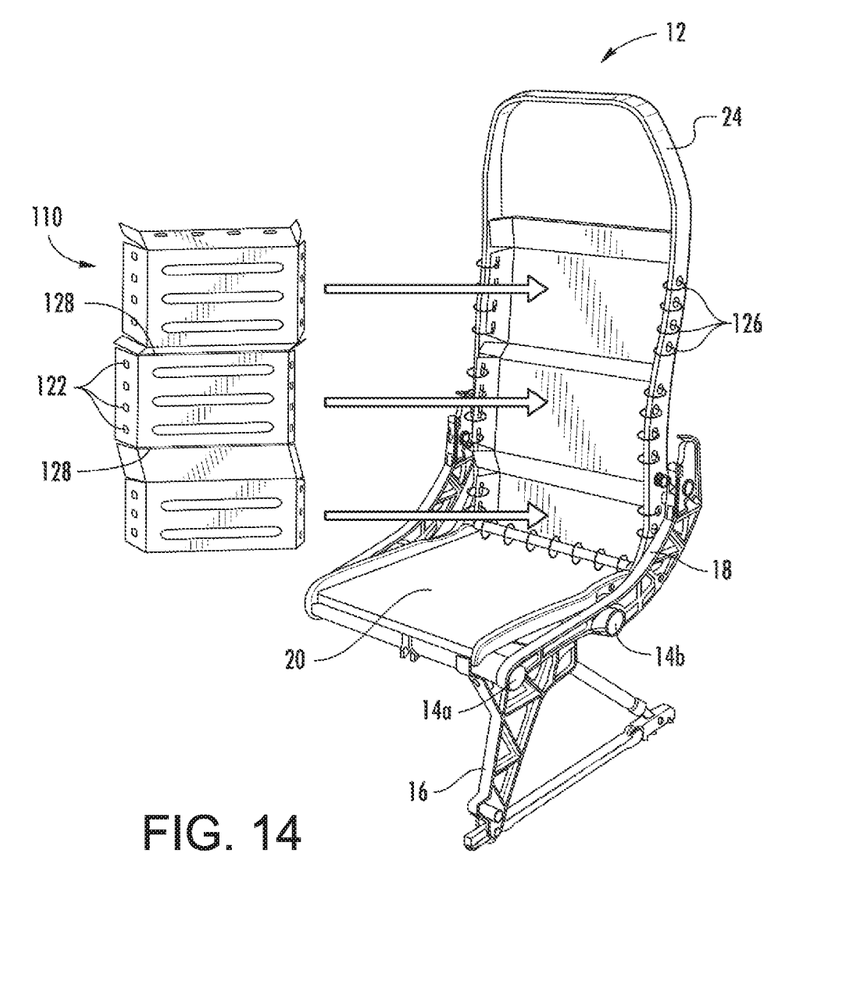
FIG. 14 is a process flow diagram illustrating an example of a manufacturing process for generating a thermoplastic composite seat back such as the seat back of FIGS. 11-13.

Various thermoplastic composite structural components may be used in place of conventional structural components in aircraft furnishings. For example, FIG. 14 is a perspective view of the thermoplastic composite seat back 110 shown in FIG. 14 positioned in a seat assembly 12, in accordance with embodiments. The seat back 110 can be inserted into a seat frame 24 of the seat assembly 12 and connected with one or more structures of the seat assembly. In some cases, the thermoplastic composite seat back 110 may be connected with the seat frame 24 alone, or may additionally be connected with a support arm 18 and/or a support 14b. Any suitable connector may be used for connecting the thermoplastic composite seat back 110 with the seat assembly 12. In some cases, the thermoplastic composite seat back 110 may be connected with the seat assembly 12 by attaching plastic locking tie straps 126 or similar connectors through the attachment features 122 of the seat back 110 and to features of the seat frame 24. The thermoplastic composite seat back 110 may be used in a new installation of a seat assembly, such as the seat assembly 12 shown, or may be used in conjunction with a retrofit of existing seat assemblies by removing an existing seat back prior to installation, in a process similar to the retrofitting process described in FIG. 10.

Figure 15:
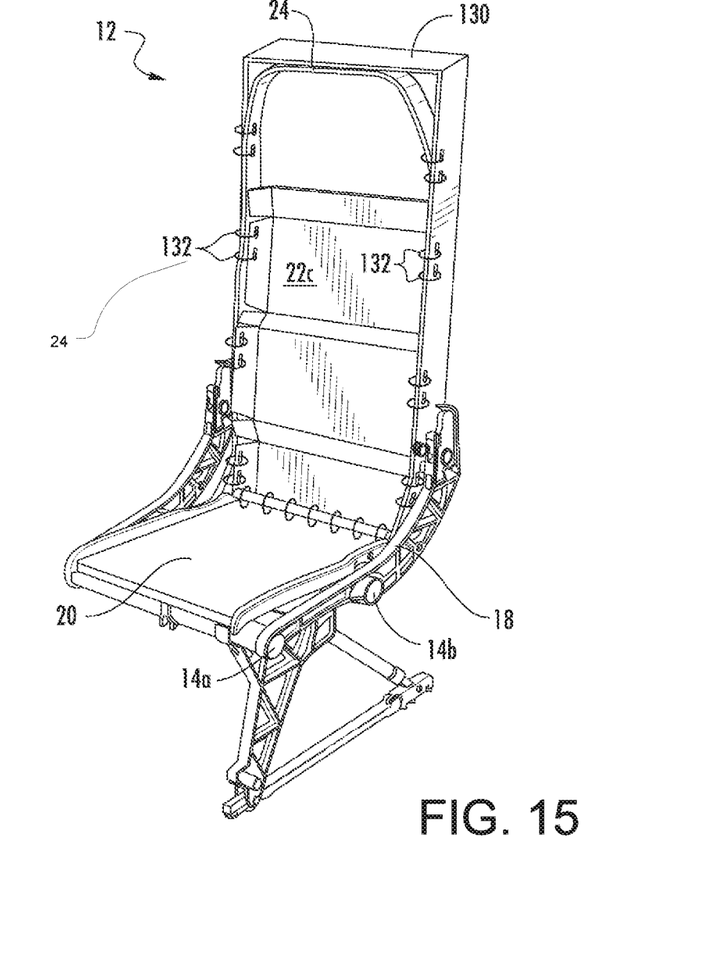
FIG. 15 is a perspective view of a seat assembly with a thermoplastic composite seat back such as the seat back of FIGS. 11-14.

By way of further example, FIG. 15 is a perspective view of a seat assembly with a thermoplastic composite seatback shroud 130, in accordance with embodiments. The thermoplastic composite seatback shroud 130 may replace a conventional seatback shroud. The thermoplastic composite seatback shroud 130 can be formed via similar manufacturing methods as the thermoplastic composite IFE box 30 and the thermoplastic composite seat back 110 described above, e.g. via process steps similar to the process steps illustrated in FIG. 6. The thermoplastic composite shroud 130 can be shaped to accommodate an aircraft seat assembly 12 and can encompass portions of the seat back 22 of the seat assembly in an installed position. The thermoplastic composite seatback shroud can 130 include a series of integrally formed attachment features 132, similar to the attachment features 122 of the thermoplastic composite seat back 110, for connecting the shroud with the seat assembly 12. For example, the thermoplastic composite seatback shroud 130 can be connected with the seat assembly 12 via a series of locking plastic tie straps or comparable fasteners. The fasteners may connect the attachment features 132 of the shroud with one or more of: the seatback frame 24, the support arms 18, the support 14b, or other structural elements of the seat assembly 12.

Various embodiments may be better understood with reference to the following examples:

Example 1

There is provided a bent composite structural component for replacing sheet metal structural parts in a passenger furnishing, the component comprising: a thermoplastic composite sheet comprising a resin and a plurality of reinforcing fibers; one or more attachment features integrally formed in the thermoplastic composite sheet; and one or more bends in the thermoplastic composite sheet defining a three-dimensional structure.

Example 2

The component of any of the preceding or subsequent examples, further comprising: one or more voids integrally formed in the thermoplastic composite sheet, the voids being configured to reduce a weight of the component and facilitate circulation of air across the component.

Example 3

The component of any of the preceding or subsequent examples, further comprising: one or more substantially triangular cuts in one or more sides of the thermoplastic composite sheet, the one or more substantially triangular cuts configured to create one or more corner joints in the three-dimensional structure of the component.

Example 4

The component of any of the preceding or subsequent examples, wherein the thermoplastic composite sheet comprises a carbon fiber composite.

Example 5

The component of any of the preceding or subsequent examples, wherein the thermoplastic composite sheet further comprises a composite with a resin comprising one or more of: polyphenylene sulfide (PPS), polyetheretherketone resin (PEEK), Polyetherimide resin (PEI), polycarbonate resin (PC), or combinations thereof.

Example 6

The component of any of the preceding or subsequent examples, the thermoplastic composite sheet further comprises a polyphenylene sulfide (PPS) resin.

Example 7

The component of any of the preceding or subsequent examples, wherein the three-dimensional structure of the component comprises a structural component of an aircraft seat.

Example 8

The component of any of the preceding or subsequent examples, wherein the three-dimensional structure of the component comprises an in-flight electronics box.

Example 9

The component of any of the preceding or subsequent examples, wherein the three-dimensional structure of the component comprises one or more of: a seat pan, a seat back, and a seatback shroud.

Example 10

The component of any of the preceding or subsequent examples, wherein the one or more bends are integrally formed in the thermoplastic composite sheet without forming a discontinuity or break in the plurality of reinforcing fibers

Example 11

The component of any of the preceding examples, wherein the component comprises an aircraft seat component conventionally formed of sheet metal.

Example 12

There is provided a method of forming a bent thermoplastic composite structural part, the method comprising: with a thermoplastic composite blank sized to form the structural component, performing a reductive manufacturing step to create one or more attachment points in the blank;

heating the blank to a transition temperature; pressing the heated blank in a pressure form configured to bend the blank along predetermined bend lines configured to define a structural part; and cooling the structural part formed from the blank to below the transition temperature.

Example 13

The method of any of the preceding or subsequent examples, wherein performing the reductive manufacturing step further comprises removing material from a perimeter of the structural part so as to form one or more gaps for corner joints; and pressing the heated blank further comprises closing the one or more gaps so as to define one or more corner joints.

Example 14

The method of any of the preceding or subsequent example, wherein heating the blank comprises heating the blank for a period of time of less than or equal to 60 seconds.

Example 15

The method of any of the preceding or subsequent examples, wherein pressing the heated blank comprises pressing for a period of time of less than or equal to 60 seconds.

Example 16

The method of any of the preceding or subsequent examples wherein performing the reductive manufacturing step further comprises cutting material from the blank using a water jet.

Example 17

The method of any of the preceding examples wherein pressing the heated blank in the pressure form further comprises bending the blank at a bend radius of at least 1 part thickness.

Example 18

There is provided a method of retrofitting an aircraft furnishing, the method comprising: removing a first structural part from a structure of an aircraft furnishing; and connecting a thermoplastic composite structural part to the structure, the thermoplastic composite structural part being configured to structurally replace the first structural part, and the thermoplastic composite structural part comprising: a thermoplastic composite sheet comprising a resin and a plurality of reinforcing fibers; one or more attachment features integrally formed in the thermoplastic composite sheet; and one or more bends in the thermoplastic composite sheet defining a three-dimensional structure.

Example 19

The method of any of the preceding or subsequent examples wherein the first structural part comprises a sheet metal structural part.

Example 20

The method of any of the preceding or subsequent examples, wherein connecting the thermoplastic composite structural part to the structure further comprises: positioning the thermoplastic composite structural part at an attachment position with respect to the structure; and connecting the thermoplastic composite structural part to the structure with one or more locking tie straps via the one or more attachment features of the thermoplastic composite structural part.

Example 21

The method of any of the preceding or subsequent examples, wherein the thermoplastic composite structural part comprises a structural component configured for an aircraft seat, and wherein the aircraft furnishing comprises an aircraft seat.

Example 22

The method of any of the preceding or subsequent examples, wherein the thermoplastic composite structural part comprises one of: a seat back, a seat pan, a seatback shroud, or an in-flight electronics box.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A bent composite structural component for a passenger furnishing, the component comprising:
a thermoplastic composite sheet comprising a resin and a plurality of reinforcing fibers bent from a planar configuration to form a three-dimensional structure, the thermoplastic composite sheet having an angled cut in a side or corner of the thermoplastic composite sheet in the planar configuration that forms a corner joint in the three-dimensional structure;
one or more attachment features integrally formed in the thermoplastic composite sheet; and
two bends in the thermoplastic composite sheet that form the three-dimensional structure by intersecting with edges of the angled cut at the corner joint,
wherein the three-dimensional structure of the component comprises a structural component of an aircraft seat.

2. The component of claim 1, further comprising:
one or more voids integrally formed in the thermoplastic composite sheet, the one or more voids being configured to reduce a weight of the component and facilitate circulation of air across the component.

3. The component of claim 1, further comprising at least two angled cuts and corresponding bends in the thermoplastic composite sheet that form at least two corner joints in the three-dimensional structure of the component.

4. The component of claim 1, wherein the thermoplastic composite sheet comprises a carbon fiber composite.

5. The component of claim 4, wherein the thermoplastic composite sheet further comprises a composite with a resin comprising one or more of: polyphenylene sulfide (PPS), polyetheretherketone resin (PEEK), Polyetherimide resin (PEI), polycarbonate resin (PC), or combinations thereof.

6. The component of claim 1, wherein the thermoplastic composite sheet further comprises a polyphenylene sulfide (PPS) resin.

7. The component of claim 1, wherein the three-dimensional structure of the component comprises an in-flight electronics box.

8. The component of claim 1, wherein the three-dimensional structure of the component comprises one or more of: a seat pan, a seat back, and a seatback shroud.

9. The component of claim 1, wherein the bends are integrally formed in the thermoplastic composite sheet without forming a discontinuity or break in the plurality of reinforcing fibers.

10. The component of claim 1, wherein the component comprises an aircraft seat component that has conventionally been formed of sheet metal.

11. The component of claim 1, wherein the structural component comprises a container.

12. The component of claim 11, wherein the container is configured to connect with an aircraft seat assembly.

13. The component of claim 11, wherein the container further comprises attachment features, the attachment features being arranged to facilitate connection of the container to one or more rails of an aircraft seat assembly.

14. A bent composite structural component for a passenger furnishing, the component comprising:
a thermoplastic composite sheet comprising a resin and a plurality of reinforcing fibers bent from a planar configuration to form a three-dimensional structure, the thermoplastic composite sheet having an angled cut in a side or corner of the thermoplastic composite sheet in the planar configuration that forms a corner joint in the three-dimensional structure;
one or more attachment features integrally formed in the thermoplastic composite sheet; and
two bends in the thermoplastic composite sheet that form the three-dimensional structure by intersecting with edges of the angled cut at the corner joint,
wherein the three-dimensional structure of the component comprises a container configured to connect with an aircraft assembly.

15. The component of claim 14, further comprising:
one or more voids integrally formed in the thermoplastic composite sheet, the one or more voids being configured to reduce a weight of the component and facilitate circulation of air across the component.

16. The component of claim 14, further comprising at least two angled cuts and corresponding bends in the thermoplastic composite sheet that form at least two corner joints in the three-dimensional structure of the component.

17. The component of claim 14, wherein the thermoplastic composite sheet comprises a carbon fiber composite.

18. The component of claim 17, wherein the thermoplastic composite sheet further comprises a composite with a resin comprising one or more of: polyphenylene sulfide (PPS), polyetheretherketone resin (PEEK), Polyetherimide resin (PEI), polycarbonate resin (PC), or combinations thereof.

19. The component of claim 14, wherein the thermoplastic composite sheet further comprises a polyphenylene sulfide (PPS) resin.

20. The component of claim 14, wherein the container comprises a structural component of an aircraft seat.

21. The component of claim 20, wherein the container comprises an in-flight electronics box.

22. The component of claim 14, wherein the bends are integrally formed in the thermoplastic composite sheet without forming a discontinuity or break in the plurality of reinforcing fibers.

23. The component of claim 14, wherein the component comprises an aircraft seat component conventionally formed of sheet metal.

24. The component of claim 14, wherein the aircraft assembly comprises an aircraft seat assembly.

25. The component of claim 14, wherein the container further comprises attachment features, the attachment features being arranged to facilitate connection of the container to one or more rails of an aircraft seat assembly.

* * * * *